United States Patent [19]
Vlakancic

[11] Patent Number: 5,545,982
[45] Date of Patent: Aug. 13, 1996

[54] CYCLE COMPUTER SYSTEM AND PROTECTIVE CABLE

[76] Inventor: Constant G. Vlakancic, 150 Jackson St., Los Gatos, Calif. 95032

[21] Appl. No.: 24,735

[22] Filed: Mar. 1, 1993

[51] Int. Cl.⁶ .............................. G01P 3/42; G01P 3/48; G01P 3/54; B62L 3/00

[52] U.S. Cl. .................... 324/174; 324/160; 324/166; 188/24.22

[58] Field of Search ................................ 324/160, 166, 324/168, 173, 174, 226, 262; 364/565; 188/24.21, 24.22; 280/281.1, 288.4; 474/90

[56] References Cited

U.S. PATENT DOCUMENTS

| | | | |
|---|---|---|---|
| 4,646,042 | 2/1987 | Eschelman | 324/174 |
| 4,768,798 | 9/1988 | Reed et al. | 280/281 R |
| 4,792,882 | 12/1988 | Guevremont | 362/72 |
| 4,887,249 | 12/1989 | Thinese | 368/10 |
| 5,356,348 | 10/1994 | Bellio et al. | 474/70 |

*Primary Examiner*—Walter E. Snow
*Attorney, Agent, or Firm*—Robert Buckley

[57] ABSTRACT

A bicycle brake or derailleur cable including at least one signal transfer pathway, such as a pair of electrical conductors or a fiber optic. In one embodiment the cable structural members are electrically conductive and form at least one signal transfer pathway. Use of the cable with a cycle computer permits the wires between a wheel rotation sensor and the computer to be protected from damage and provides for an improved appearance.

20 Claims, 3 Drawing Sheets

CYCLE COMPUTER SYSTEM AND PROTECTIVE CABLE

BACKGROUND OF THE INVENTION

1. Field of the Invention

The present invention relates to bicycles and in particular to bicycle brake and derailleur cables.

2. Prior Art

Bicycle ("cycle") computers have become quite popular with many bicycle owners. More versatile, attractive, lighter and smaller than the ordinary bicycle speedometer, the cycle computer is able to selectively display current speed, distance travelled, number of pedal strokes per minute and other imaginative and useful items of interest to the cycle enthusiast.

In a typical installation, a magnetic sensor is attached to one side of the front or rear wheel fork, and a magnet is attached to the spokes of the adjacent bicycle wheel. The positions of the sensor and magnet are adjusted so that as the bicycle is operated, the magnet passes the magnetic sensor producing an electrical output pulse once each wheel revolution. This sensor output pulse is connected by a cable to the cycle computer where it can be converted into the desired information and displayed.

Users of such systems have reported that the cable used to connect the sensor to the computer is subject to damage, particularly when the sensor and magnet are installed at the rear wheel so that the cable must be attached along the frame where it is most likely to become snagged as a rider gets on or off the bicycle. Unlike the cables used for the brakes and derailleurs, the cycle computer cable is of small diameter and is relatively fragile. In addition, some cyclists have complained that the clamps used to secure the sensor cable to the bicycle frame are unsightly and can snag and cause damage to their expensive and colorful costumes.

Therefore it is an object of the present invention to provide a cycle computer cable that is highly resistant to accidental damage without adding additional weight or bulk to a bicycle.

It is also an object of the present invention to provide a cycle computer cable which does not detract from either the appearance nor the aerodynamic performance of a bicycle.

It is yet another object of the present invention to provide a cycle computer cable which enhances the safety and convenience of the cyclist.

SUMMARY OF THE INVENTION

The above objects have been met in the present invention by incorporating the electrical conductors of a cycle computer cable into a normal brake or derailleur cable. The cycle computer is installed on the handlebar, near a brake and shift lever assembly. Access to the computer end of the protected electrical conductors is made by attaching the brake or derailleur cable to the computer and making electrical connection to the conductors while allowing the mechanical control portion of the cable to continue to the lever assembly. A rotation sensor is attached to an opposite end of the conductors. The computer can be permanently connected to the cable or made easily detachable to prevent theft when the bicycle is left unattended.

In alternative embodiments, electrically conductive and mutually insulated mechanical and structural elements of the cable serve as the electrical conductors. Alternatively, fiber optical light pathways are incorporated into the brake or derailleur cable in place of electrical conductors, and the sensor varies a light beam as a function of wheel or gear rotation.

DESCRIPTION OF THE PREFERRED EMBODIMENT

Figure 1A:
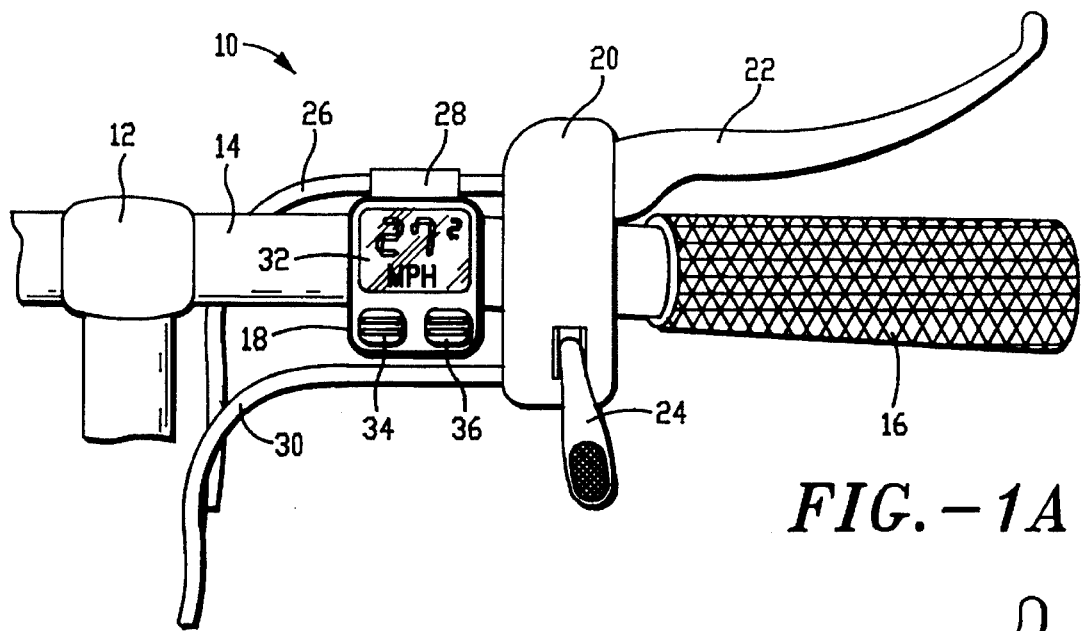
FIG. 1A shows the right-hand side of a bicycle handlebar including a cycle computer and a rear brake and derailleur control lever assembly, the rear brake cable passes through an extension of the computer enclosure, computer control switches are located at the computer.

With reference to FIG. 1A, there is shown generally the right-hand side of a bicycle handlebar 10, including a yoke 12, a bar 14, a grip 16, a cycle computer 18, and a control lever assembly 20 which further includes a rear brake lever 22 and a rear derailleur lever 24. Also shown are a rear brake cable 26 which passes through an extension 28 of the cycle computer 18, and a rear derailleur cable 30. The cycle computer 18 includes a display 32 and a pair of control switches 34, and 36. Cycle computer 18 is attachable and detachable from extension 28 so that the computer can be removed when the bicycle must be left unattended, much in the manner some car radios can be easily removed and replaced.

As will be discussed below with respect to additional figures, the rear brake cable 26 includes electrical conductors or fiber optics which are used to carry an output signal of a rotation sensor from the area of a rear wheel brake to the cycle computer 18. Connection is made within the extension 28 between these conductors or fiber optics and the circuits of the cycle computer 18. A mechanical control portion of the rear brake cable 26 is shown in FIG. 1A extending into the control lever assembly 20 where that portion of the rear brake cable 26 is attached to the rear brake lever 22.

Figure 1B:
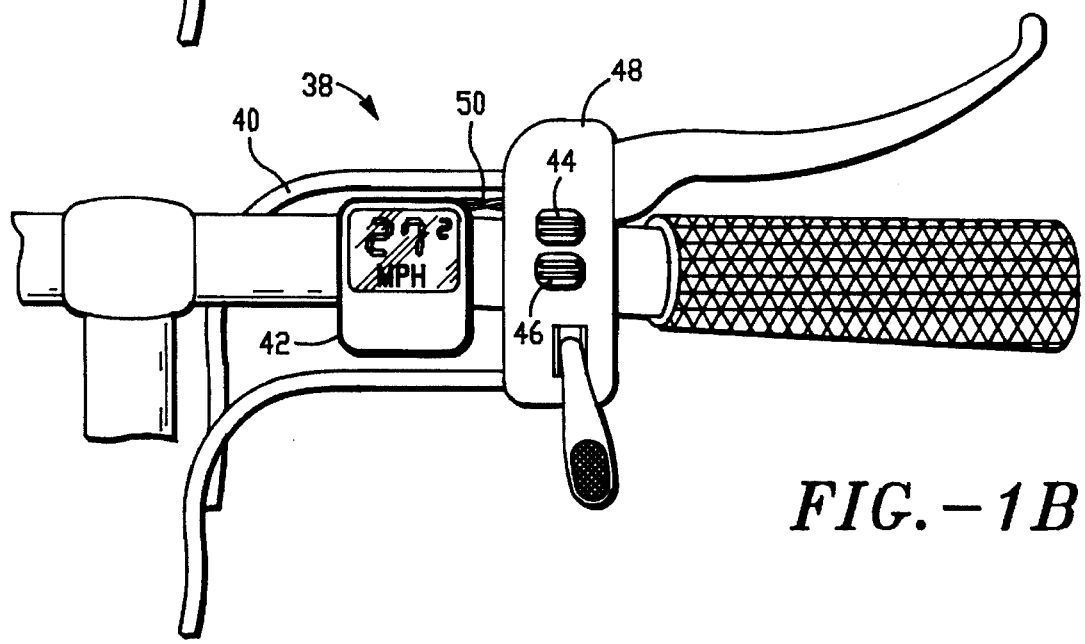
FIG. 1B shows a right side handlebar and computer, the rear brake cable does not pass through the computer, and the computer control switches are located on the control lever assembly, wires from this assembly make connection to the computer.

An alternative embodiment 38 is shown in FIG. 1B wherein a rear brake cable 40 makes no direct connection to a cycle computer 42. Computer control switches 44 and 46 are located at a control lever assembly 48. The rear brake cable 40 includes protected electrical conductors (not shown in FIG. 1B) used to connect the cycle computer 42 to a rotation sensor located at the rear wheel (also not shown). Electrical connections between the protected conductors, the computer control switches 44 and 46 and the cycle computer 42 are completed via electrical conductors 50 which are shown extending between the cycle computer 42 and the control lever assembly 48.

Figure 2A:
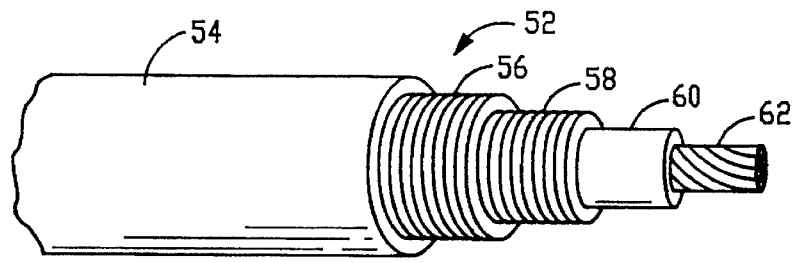
FIG. 2A is a pictorial view showing major structural elements of a typical prior art brake/derailleur control cable.

The structural elements of a typical prior art control cable 52 are shown in FIG. 2A. A cable employing this structure is commonly used in bicycle brake and derailleur cables. Prior art control cable 52 includes an outer protective covering 54, a pair of concentric spiral wound major structural members 56 and 58, inner protective sheath 60, and central control element 62 which is free to slide within inner protective sheath 60. The major structural members 56 and 58 are made of steel wire and are wound in opposite directions. The inner protective sheath 60 fits central control element 62 loosely, allowing the central control element 62 to slide in an axial direction with respect to the major structural members 56 and 58.

Figure 2B:
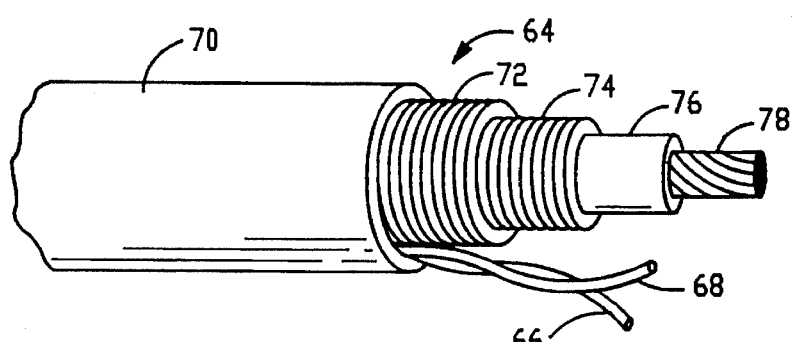
FIG. 2B shows the control cable of FIG. 2A having a pair of electrical conductors or fiber optics within an outer protective covering.

FIG. 2B shows a control cable 64 modified to include a pair of electrical conductors or fiber optics 66 and 68 within an outer protective covering 70. The control cable 64 includes a pair of concentric, spiral wound structural members 72 and 74 made of steel wire or other suitable material and wound in opposite directions. An inner protective sheath 76 loosely encloses a central control member 78 allowing control member 78 to slide in an axial direction with respect to the spiral wound structural members 72 and 74. The essence of the present invention is the placement of signal carrying pathways inside a bicycle brake or derailleur control cable. Such a signal pathway may consist of a single electrical conductor enclosed within the cable, the electrical circuit path being completed using an electrically conductive bicycle frame. The number of electrical conductors or fiber optic pathways enclosed within the protective cable covering may be greater than the number shown in FIG. 2B. Both electrical conductors and fiber optics may be enclosed within an outer protective covering.

Figure 2C:
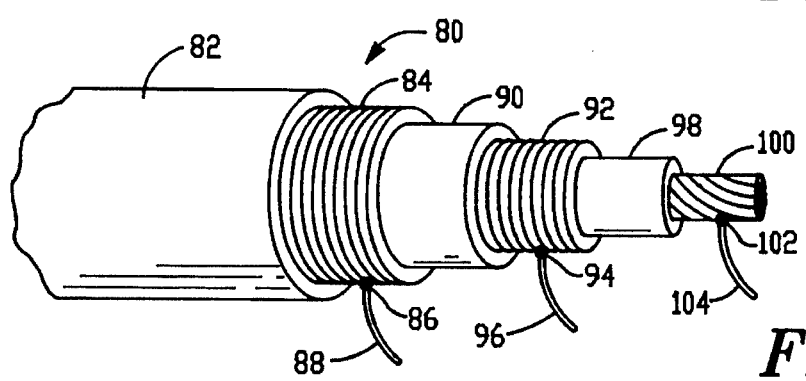
FIG. 2C shows a control cable having insulating layers separating conductive structural members and having electrical connections made to each conductive member.

FIG. 2C shows a control cable 80 in which electrically conductive and mutually insulated structural members 84, 92 and 100 provide signal paths within an outer protective covering 82. A first structural member 84 is made of electrically conductive material capable of providing mechanical support. Electrical connection 86 is made between the first structural member 84 and electrical conductor 88. Insulating sheath 90 separates first structural member 84 from an electrically conductive second structural member 92. An electrical connection 94 is made between structural member 92 and an electrical conductor 96. Inner protective sheath 98 loosely engages central control element 100 allowing the central element to slide in an axial direction with respect to structural members 84 and 92. Central control element 100 is electrically conductive and has an electrical connection 102 made to electrical conductor 104.

Electrical connections 86, 94 and 102 are for illustrative purposes only to show one manner in which electrical connection can be made to the conductive structural cable elements. An electrically conductive bicycle frame can be used to provide an additional conductive path. Additional electrical conductors and/or optical fibers can be enclosed within the outer protective covering 82 of cable 80.

Figure 3:
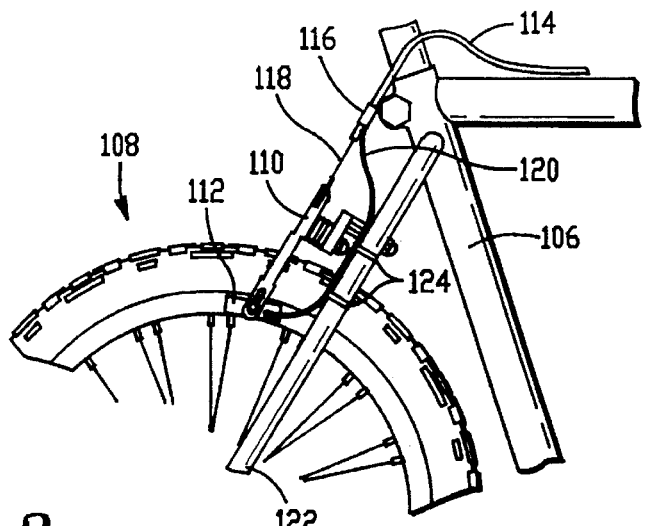
FIG. 3 is a partial side view of a bicycle rear brake assembly showing continuation of an electrical or optical connection from the control cable to a brake pad.

FIG. 3 is a partial side view showing bicycle frame 106, rear wheel 108, rear brake assembly 110, brake pad 112, rear brake cable 114, rear brake cable termination 116, cable central control element 118, and signal conductor 120. The signal conductor 120 is shown extending from the rear brake cable termination 116 and following one leg of a rear wheel fork and entering brake pad 112. The signal conductor 120 is shown clamped in two places 124 to the leg 122 of the rear wheel fork.

Figure 4:
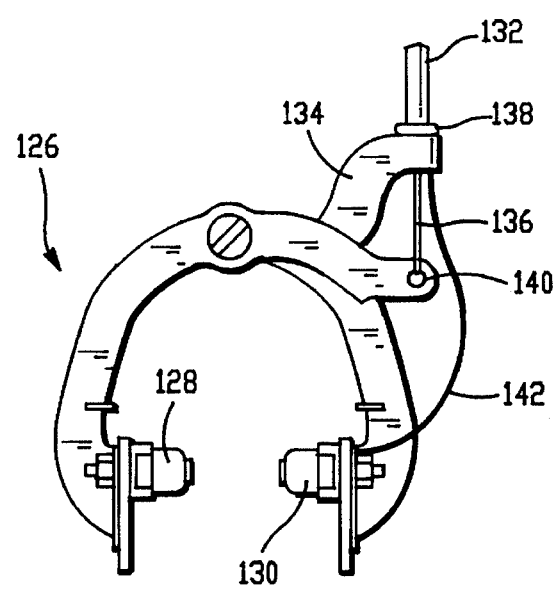
FIG. 4 is a plan view of a typical bicycle brake showing an alternative routing of a signal connection between one end of a brake cable and a brake pad.

FIG. 4 shows a plan view of a typical bicycle brake 126 of the caliper type. The brake includes a pair of opposed brake pads 128 and 130. A brake cable 132 is terminated at an extension 134 of one caliper. Cable central control element 136 extends from a cable termination 138 and is attached to one end 140 of an opposing brake caliper. Signal conductor 142 extends from cable termination 138 and is shown entering brake pad 130.

Figure 5:
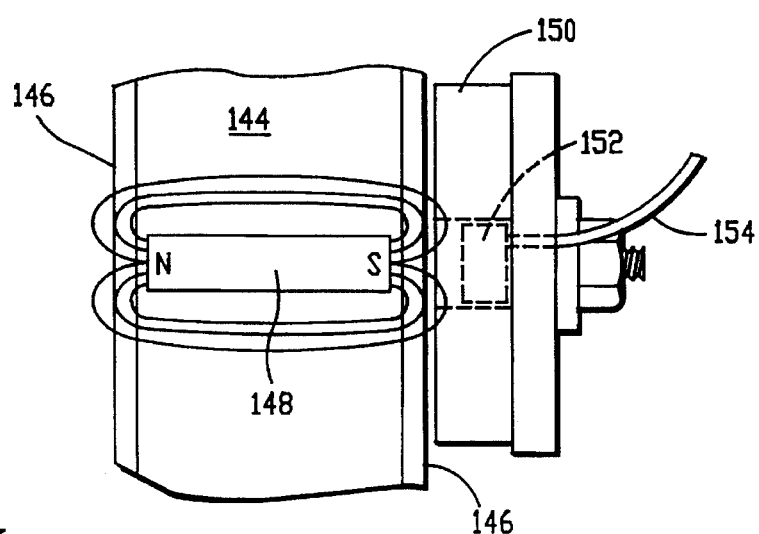
FIG. 5 is a schematic view of a portion of a bicycle wheel rim and one adjacent brake pad, a magnet is located within the wheel rim and a sensor is located within the brake pad.

FIG. 5 is a partial schematic diagram showing a portion of a wheel rim 144 having edges 146. The wheel rim 144 has a magnet 148 located between edges 146 and oriented so that opposing magnet poles "N" and "S" are adjacent opposing rim edges 146. The magnet is held in place by an adhesive applied between magnet and rim and also by an inflated inner tube and tire (not shown). Brake pad 150 is shown adjacent one wheel rim edge 146. Sensor 152 is recessed within brake pad 150 and attached to signal conductor 154.

When the bicycle is being operated, wheel rim 144 will rotate about its axle and magnet 148 will pass sensor 152 once per wheel revolution. Each time magnet 148 passes sensor 152, an output of sensor 152 will transmit a signal (a pulse) via signal conductor 154 to a cycle computer (not shown). The number of output pulses per wheel revolution can be increased by placing additional magnets at intervals around the wheel rim 144. The use of such additional magnets increases reliability at low speeds by reducing the chance that an occasional pulse may be missed.

In an alternative embodiment, sensor 152 includes a signal conditioning circuit (not shown) which amplifies and shapes the pulse before it is transferred to the computer via signal conductor 154. When the signal conditioning circuit is present, operating power is obtained via additional electrical conductors within signal conductor 154.

Figure 6:
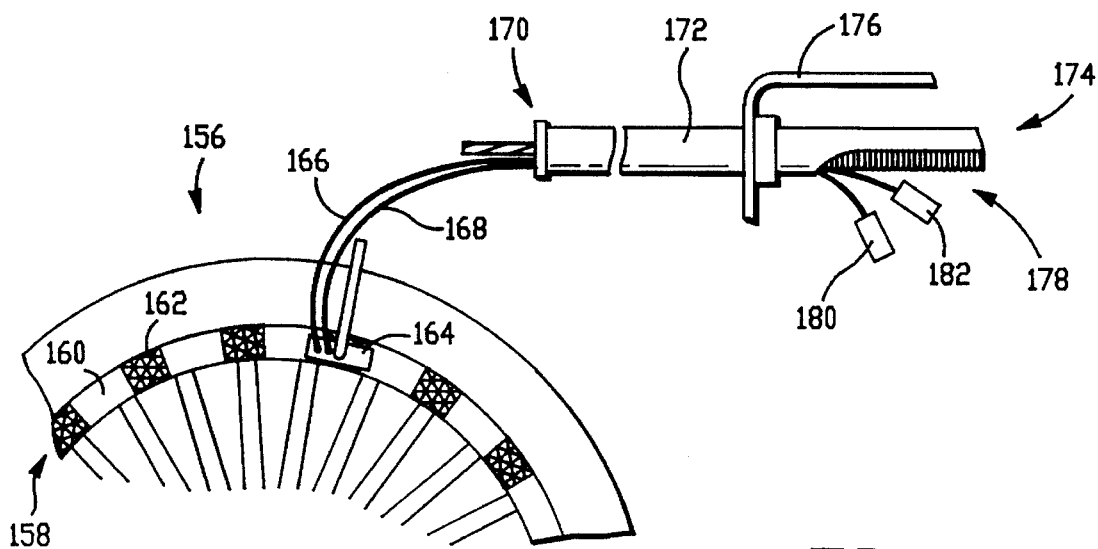
FIG. 6 is a schematic view of a brake cable including a pair of fiber optic conductors, the fiber optics are shown terminated at a brake pad at one end and at a separate light source and photosensor inside an enclosure at the other end.

FIG. 6 is a schematic diagram showing a bicycle wheel 156 having a wheel rim 158 which has reflective 160 and nonreflective 162 regions. Brake pad 164 provides a termination for a pair of optical fiber light paths 166 and 168 which extend from a brake end of a brake cable 172 according to one embodiment of the present invention. A brake lever end of cable 172 is shown passing through one side of an enclosure. Cable outer protective covering has been removed 178 and fiber optics 166 and 168 are shown attached to light source 180 and photosensor 182 respectively.

Light from source 180 is carried to brake pad 164 via fiber optic path 166. If a reflective region 160 of wheel rim 158 is opposite the brake pad end of optic fiber path 166, light is reflected into the brake pad end of fiber optic path 168. This reflected light is returned via cable 172 to photosensor 182 which produces an output signal responsive to the reflected light. As wheel 156 is rotated during bicycle operation, light is alternately reflected and not reflected from the regions 160 and 162 of wheel rim 158. A series of output pulses will be produced by photosensor 182 having a rate proportional to the speed of wheel rotation. The series of output pulses is converted by a cycle computer into a display of current speed, total distance traveled or other displayed parameter of interest to a cyclist.

Figure 7:
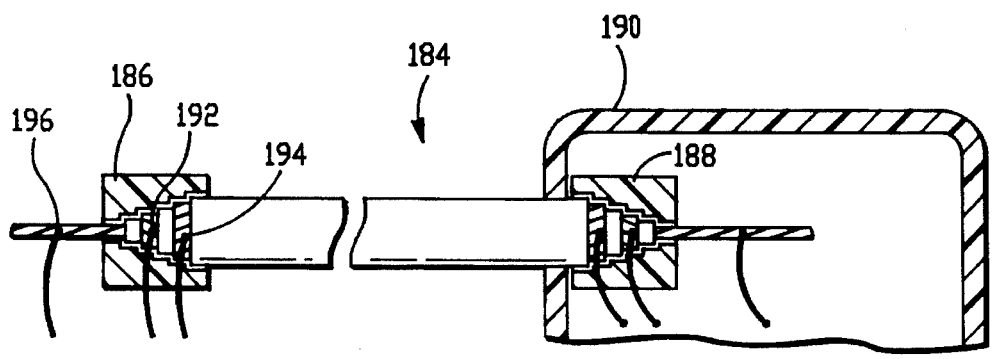
FIG. 7 shows the control cable of FIG. 2C having electrical connections to conductive structural members at both ends and mechanical support for structural members.

FIG. 7 is a schematic diagram showing mechanical and electrical termination of the ends of a cable 184 of the type shown in FIG. 2C in which structural elements of the cable are electrically conductive and are mutually insulated. Stepped retaining fixtures 186 and 188 are shown supporting the cable at its ends. One end of cable 184 is shown passing into an enclosure 190 which represents an extension of the enclosure of a cycle computer (e.g., extension 28 of FIG. 1A) or a control lever assembly (e.g., control lever assembly 48 of FIG. 1B). Stepped retaining fixture 186 provides support for each of the elements of one end of cable 184 while allowing electrical connection to be made to the major structural members 192 and 194 and central control element 196. Stepped retaining fixture 188 accomplishes the same task at the enclosure end of cable 184.

AN APPLICATION OF THE INVENTION

FIGS. 1A, 2B, 3 and 5 include the necessary features of a typical installation of a cycle computer using the present invention.

Conductors 66 and 68 (FIG. 2B) are used to connect sensor 152 (FIG. 5) to cycle computer 18 (FIG. 1A). Access to the conductors 66 and 68 is available as rear brake cable 26 (FIG. 1A) passes through extension 28 (FIG. 1A). Outer protective covering 70 (FIG. 2B) is partially removed (see FIG. 6) so that connection can be made between the conductors and the circuits of the computer 18.

The sensor is located within one of the rear brake pads 112 (FIG. 3) and is activated by one or more magnets 148 (FIG. 5) located within the rear wheel rim. The sensor output signal is carried via signal conductor 120 (FIG. 3) along the rear brake cable 114 (FIG. 3) and 26 (FIG. 1A) to the computer 18.

Operation of the brake lever 22 (FIG. 1A) causes central control element 78 (FIG. 2B) to transfer a displacement through computer enclosure extension 28 (FIG. 1A), via the rear brake cable, to rear brake assembly 110 (FIG. 3), causing opposing brake pads to engage the rear wheel rim.

The manner in which the magnets produce sensor output pulses and in which those pulses are converted and displayed by the computer have been discussed elsewhere.

I claim:

1. A cycle computer system for use on a bicycle having a brake of the type wherein a pair of opposing brake pads are pressed against a wheel rim when a brake lever is operated, the brake being connected to the brake lever via a cable assembly, the system comprising:

a magnetic sensor incorporated into one of the brake pads and producing an output signal proportional to a rate of change of a varying magnetic field;

at least one magnet being located within the wheel rim such that when the wheel rotates, the at least one magnet will pass between the brake pads thereby exposing the sensor to a varying magnetic field proportional to a rate of wheel rotation;

a pair of electrical conductors incorporated into the cable assembly, one end of the conductors being connected to receive the sensor output signal;

a cycle computer connected to the other end of the conductors for receiving the sensor output signal, the cycle computer converting the signal to a manually selected function of wheel rotation and time, the computer including means for displaying the result of the conversion and for selecting said function.

2. A control cable of the type comprising an elongated flexible outer control member having an axial opening extending from a first end to a second end, and including a flexible inner control member being slidably disposed within the axial opening and extending beyond the first and second ends, the outer member being enclosed by a protective covering, the outer and inner control members being adapted for cooperating in receiving a force applied in the axial direction relative to one control member with respect to the other at one end and for transferring the force to the other end, said cable including communication means for transferring a signal from the first end to the second end, the communication means being enclosed by the protective covering.

3. The control cable of claim 2, wherein the communication means comprises a plurality of insulated electrical conductors.

4. The control cable of claim 3, wherein the control members are electrically conductive and are electrically insulated from each other and form said plurality of insulated electrical conductors.

5. The control cable of claim 2, having at least one electrically conductive and insulated control member, said member forming the communication means.

6. The control cable of claim 2, wherein the communication means comprises at least one fiber optic conductor.

7. A performance measurement and display system for use with a bicycle having mechanical control cables for brakes and/or derailleurs, said system comprising:

rotation sensor means being operatively associated with a bicycle rotating member for producing a periodic output signal representative of bicycle operation;

cycle computer means for receiving the output signal, and for converting it to a selected function of distance and time for display, said computer means being responsive to at least one function selection signal;

display means connected to receive and display the selected function;

manually operated signalling means for generating the at least one function selection signal; and output signal communication means having a sensor end connected to receive the sensor output signal and a computer end connected to deliver the signal to the computer means, said communication means being integrated into one of the mechanical control cables.

8. The system of claim 7 wherein said rotation sensor means is operatively associated with a front wheel of the bicycle and the output signal communication means is integrated into a front wheel brake cable.

9. The system of claim 7 wherein said rotation sensor means is operatively associated with a crank derailleur of the bicycle and the output signal communication means is integrated into a crank derailleur cable.

10. The system of claim 7 wherein said rotation sensor means is operatively associated with a rear wheel of the bicycle and the output signal communication means is integrated into a rear wheel brake cable.

11. The system of claim 7 wherein said rotation sensor means is operatively associated with a rear wheel of the bicycle and the output signal communication means is integrated into a rear derailleur cable.

12. The system of claim 7 wherein said rotation sensor means includes a sensor and a stimulus, the sensor being attached to a non-rotating member of the bicycle and the stimulus being attached to a rotating member adjacent the sensor such that rotation of said rotating member causes the stimulus to induce the periodic output signal in the sensor.

13. The system of claim 12 wherein the sensor is responsive to a varying magnetic field and produces an electrical output signal, and the stimulus is a magnet.

14. The system of claim 13 wherein the sensor is located within a brake pad and the magnet is located within a bicycle wheel rim associated with the brake pad.

15. The system of claim 12 wherein the sensor is responsive to a light source and produces an electrical output signal, the output signal being proportional to an amount of light falling upon the sensor, and the stimulus varies the amount of light from the source falling upon the sensor as a function of rotation of said rotating member.

16. The system of claim 7 wherein the manually operated signalling means is at least one switch.

17. The system of claim 16 wherein the at least one switch is located on a mechanical control lever assembly associated with the mechanical control cable which incorporates the output signal communication means.

18. The system of claim 7 further comprising means for easily attaching and detaching the cycle computer means, display means and the manually operated signalling means from said system.

19. The system of claim 12 wherein said sensor means includes means connected to receive the sensor output signal and to amplify and condition said signal before connection to the communication means.

20. The system of claim 19 wherein operating power for said signal amplifying and conditioning means is supplied via electrical conductors incorporated into a mechanical control cable.

* * * * *